(12) United States Patent
Snyder et al.

(10) Patent No.: US 11,434,775 B2
(45) Date of Patent: Sep. 6, 2022

(54) TURBINE ENGINE WITH METERED COOLING SYSTEM

(71) Applicant: Rolls-Royce North American Technologies Inc., Indianapolis, IN (US)

(72) Inventors: Brandon R. Snyder, Greenwood, IN (US); Jonathan S. Sands, Clayton, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 123 days.

(21) Appl. No.: 17/007,639

(22) Filed: Aug. 31, 2020

(65) Prior Publication Data

US 2022/0065119 A1    Mar. 3, 2022

(51) Int. Cl.
 *F01D 9/06* (2006.01)
 *F02C 7/18* (2006.01)
 *F01D 25/12* (2006.01)

(52) U.S. Cl.
 CPC ............. *F01D 9/065* (2013.01); *F01D 25/12* (2013.01); *F02C 7/18* (2013.01); *F05D 2220/32* (2013.01); *F05D 2260/221* (2013.01)

(58) Field of Classification Search
 CPC .. F01D 25/12; F01D 9/065; F02C 7/18; F02C 6/08; F05D 2260/221; F05D 2220/32
 See application file for complete search history.

(56) References Cited

U.S. PATENT DOCUMENTS

| | | |
|---|---|---|
| 3,112,764 A | 12/1963 | Anderson et al. |
| 3,706,508 A | 12/1972 | Moskowitz et al. |
| 3,707,163 A | 12/1972 | Hugler |
| 4,742,685 A | 5/1988 | Halvorsen et al. |
| 4,805,398 A * | 2/1989 | Jourdain ........ F01D 5/082 60/806 |
| 4,966,315 A | 10/1990 | Tinnes et al. |
| 5,094,270 A | 3/1992 | Reimert |
| 5,518,154 A | 5/1996 | Vassilicos et al. |
| 6,491,496 B2 | 12/2002 | Starkweather |
| 6,783,038 B2 | 8/2004 | Xu et al. |
| 8,356,630 B2 | 1/2013 | Stretch et al. |
| 8,613,199 B2 | 12/2013 | Kimmel et al. |
| 9,856,741 B2 | 1/2018 | Grant et al. |
| 10,352,194 B2 * | 7/2019 | Varney ............ F16C 27/045 |
| 10,570,759 B2 | 2/2020 | Racca |
| 10,683,941 B2 | 6/2020 | Lah et al. |
| 2014/0126991 A1 | 5/2014 | Ekanayake et al. |
| 2015/0267543 A1 * | 9/2015 | Gerber ............ F04D 29/2227 416/212 R |
| 2019/0376414 A1 * | 12/2019 | Galle ................. F02C 6/08 |

FOREIGN PATENT DOCUMENTS

| | | |
|---|---|---|
| CN | 208107184 | 11/2018 |
| EP | 0515130 A1 | 11/1992 |
| EP | 0649975 A1 | 4/1995 |

* cited by examiner

*Primary Examiner* — Justin D S Seabe
*Assistant Examiner* — Andrew Thanh Bui
(74) *Attorney, Agent, or Firm* — Barnes & Thornburg LLP

(57) ABSTRACT

An assembly adapted for use with a gas turbine engine includes a static component and a metering band. The static component is fixed relative to an axis. The metering band is arranged to extend circumferentially at least partway about the axis and is coupled with the static component. The metering band defines at least a portion of a cooling passageway for air to flow through.

17 Claims, 6 Drawing Sheets

TURBINE ENGINE WITH METERED COOLING SYSTEM

FIELD OF THE DISCLOSURE

The present disclosure relates generally to gas turbine engines, and more specifically to cooling systems for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Cooling air is supplied from the compressor to the turbine through various cooling ducts and passages around the gas turbine engine. Cooling ducts can pipe cooling air radially outward of the engine casing, or through passageways between engine components radially inward of the engine flow path. Components in the turbine operate at high temperatures may use cooling air to lower the component temperature into an operating range and extend the life of the component.

Cooling ducts and passageways may be sized to provide adequate cooling air flow to the turbine components. The cooling flow provided is typically sized for the hottest point in an engine cycle and for a component at the end of its operating life. This often means that excess cooling flow may be provided to the components at idle conditions in the engine cycle and to new components that have not deteriorated after extended use.

SUMMARY

The present disclosure may comprise one or more of the following features and combinations thereof.

According to the present disclosure, an assembly for a gas turbine engine may comprise a static component, a first metering band, and a second metering band. The static component may be fixed relative to an axis. The first metering band may be arranged to extend circumferentially at least partway about the axis and coupled with the static component at a discrete location. The second metering band may be located adjacent to the first metering band and arranged to extend circumferentially at least partway about the axis and coupled with the static component.

The first metering band may define a portion of a cooling passageway. The second metering band may define another portion of the cooling passageway. The first metering band may be configured to expand and contract relative to the static component in response to temperature changes of the assembly. The expansions and contractions of the first metering band may change a size of the cooling passageway.

In some embodiments, the second metering band may be located axially adjacent to the first metering band. In other embodiments, the first metering band may have a first coefficient of thermal expansion and the second metering band may have a second coefficient of thermal expansion. The first coefficient of thermal expansion may be different from the second coefficient of thermal expansion.

In another embodiment, the first metering band may be formed to define a first aperture that extends through the first metering band. The second metering band may be formed to define a second aperture that extends through the second metering band. The cooling passageway may be defined by the first aperture and the second aperture.

In some embodiments, the first aperture may extend axially through the first metering band. The second aperture may extend axially through the second metering band.

In other embodiments, the first metering band may extend circumferentially between a first terminal end and a second terminal end. The second terminal end may be free to move relative to the first terminal end.

In another embodiment, the first metering band may include a first segment having a first radial thickness and a second segment having a second radial thickness. The second radial thickness may be greater than the first radial thickness. The second segment may be formed to include a plurality of apertures that extend axially though the first metering band.

In some embodiments, the first metering band may extend in a first circumferential direction about the axis from a first terminal end to a second terminal end of the first metering band. The second metering band may extend in a second circumferential direction, opposite the first circumferential direction, from a first terminal end to a second terminal end of the second metering band. The first terminal end of the first metering band and the first terminal end of the second metering band may be fixed to the static component.

In other embodiments, the first metering band may be a full annular hoop. The full annular hoop may be formed to include a plurality of circumferential slots that extend axially through the first metering band.

According to another aspect of the present disclosure, an assembly for a gas turbine engine may comprise a static component, a first metering band, and a second metering band. The static component may be fixed in position relative to an axis. The static component may be formed to define a channel that extends circumferentially around the axis.

The first metering band may be located in the channel and arranged to extend circumferentially at least partway about the axis. The first metering band may be coupled to the static component at a first discrete location for movement with the static component. The second metering band may be located in the channel and arranged to extend circumferentially at least partway about the axis. The second metering band may be located adjacent to the first metering band. The second metering band may be coupled to the static component at a second discrete location for movement with the static component.

The first metering band and the second metering band may cooperate to define a cooling passageway. The first metering band and the second metering band may be configured to expand and contract relative to the static component in response to temperature changes of the assembly to change a size of the cooling passageway.

In some embodiments, the first metering band may be formed to include a first aperture that extends through the first metering band. The second metering band may be formed to include a second aperture that extends through the second metering band. An overlap of the first aperture and the second aperture may be configured to vary in response to the temperature changes of the assembly to change the size of the cooling passageway.

In other embodiments, the first aperture may extend axially through the first metering band and the second aperture may extend axially through the second metering band. In another embodiment, the first metering band may extend circumferentially between a first terminal end and a second terminal end and the second terminal end may be free to move relative to the first terminal end.

In some embodiments, the first metering band may include a thermal expansion ring having a first radial thickness and an aperture ring having a second radial thickness. The second radial thickness may be greater than the first radial thickness. The first aperture may be formed in the aperture ring. In other embodiments, the first metering band may extend circumferentially about the axis greater than 360 degrees from the first terminal end to the second terminal end.

In another embodiment, the first metering band may have a first coefficient of thermal expansion. The second metering band may have a second coefficient of thermal expansion. The first coefficient of thermal expansion may be different from the second coefficient of thermal expansion.

In a further embodiment, the first metering band may be a full annular hoop formed to include a plurality of circumferential slots that extend axially through the first metering band. The second metering band may be a full annular hoop formed to include a plurality of circumferential slots that extend axially through the second metering band.

In some embodiments, the first metering band may extend in a first circumferential direction about the axis from a first terminal end to a second terminal end of the first metering band. The second metering band may extend in a second circumferential direction, opposite the first circumferential direction, from a first terminal end to a second terminal end of the second metering band. The first terminal end of the first metering band and the first terminal end of the second metering band may be fixed to the static component.

According to another aspect of the present disclosure, a method for varying cooling flow in a gas turbine engine may include a number of steps. The method may include mounting a first metering band to a static component so that a first terminal end of the first metering band is fixed at a discrete location of the static component and a second terminal end of the first metering band is free to move relative to the first terminal end. An aperture may extend through the first metering band to form a portion of a cooling passageway. The method may further arrange a first aperture that extends through in the first metering band to form a portion of a cooling passageway to overlap with a second aperture that extends through the static component that forms another portion of the cooling passageway to form a cooling passage area. The method may further vary a circumferential length of the first metering band so that the second terminal end extends away from and toward the first terminal end in response to temperature changes of the gas turbine engine so that the first aperture and the second aperture move relative to each other and vary the cooling passage area.

In some embodiments, the method may further include the step of mounting a second metering band to the static component adjacent to the first metering band so that the second metering band is fixed to the static component at a first terminal end of the second metering band and a second terminal end is free to move relative to the first terminal end, and the second metering band forms a portion of the cooling passageway. The second metering band may include a third aperture arranged to overlap the first and second aperture, and the second metering band may expand in response the temperature changes of the gas turbine engine and further varies the cooling passage area.

These and other features of the present disclosure will become more apparent from the following description of the illustrative embodiments.

DETAILED DESCRIPTION OF THE DRAWINGS

Figure 1:
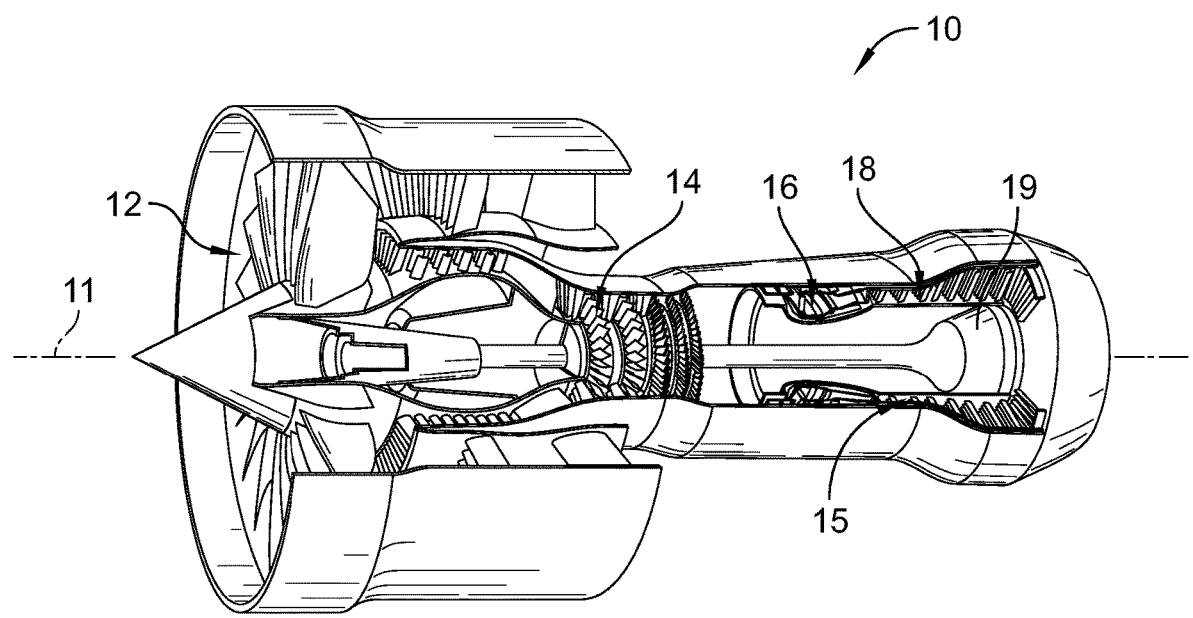
FIG. 1 is a perspective view of a gas turbine engine that includes a fan, a compressor, a combustor, and a turbine, the gas turbine engine including a variable cooling meter assembly to adjust the amount of cooling flow provided from the compressor to the components in the turbine, combustor, or other heated areas.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. Cooling air is provided to the turbine 18 from the compressor 14 via a number of cooling ducts and cooling passageways 24. In the illustrative embodiment in FIG. 2 the cooling passageway 24 provides cooling air to a cavity aft of a turbine rotor 19 and radially inward of the flow path 15. The cooling passageway 24 extends through a static component 20 and a variable cooling meter assembly 22 that is located in a channel 36 the static component 20.

Figure 2:
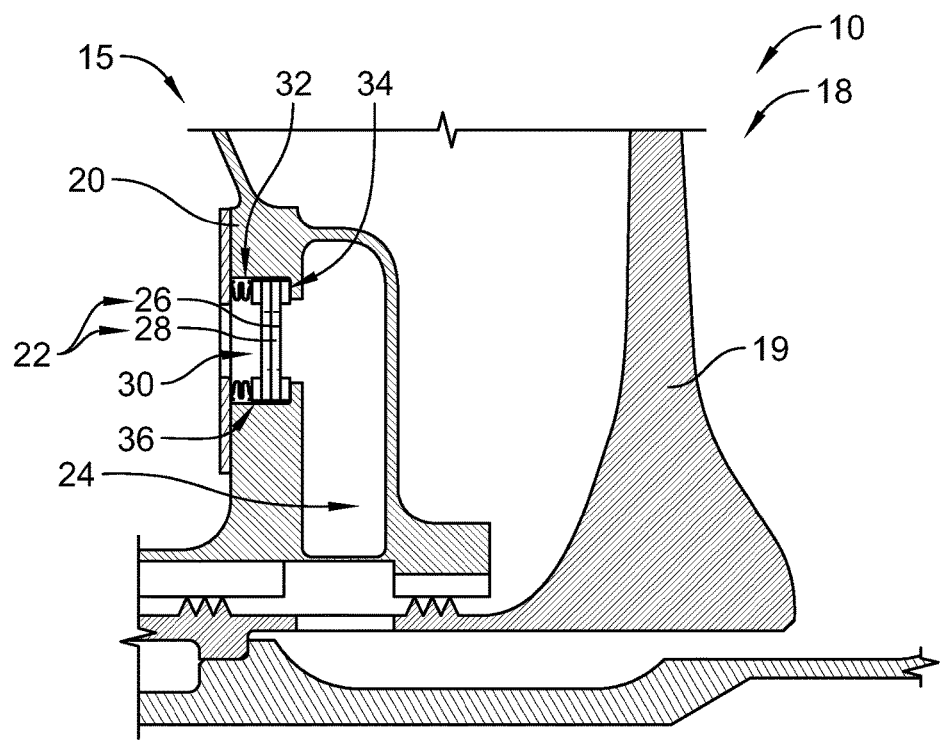
FIG. 2 is a cross-sectional view of a portion of the turbine included in the gas turbine engine of FIG. 1 showing the variable cooling meter assembly is located in a groove of a static component that forms part of a cooling passageway, and the cooling passageway is metered by the variable cooling meter assembly to provide cooling air radially inward of the turbine rotor and then axially aft so that cooling air may fill the cavity aft of the turbine rotor.
Figure 3:
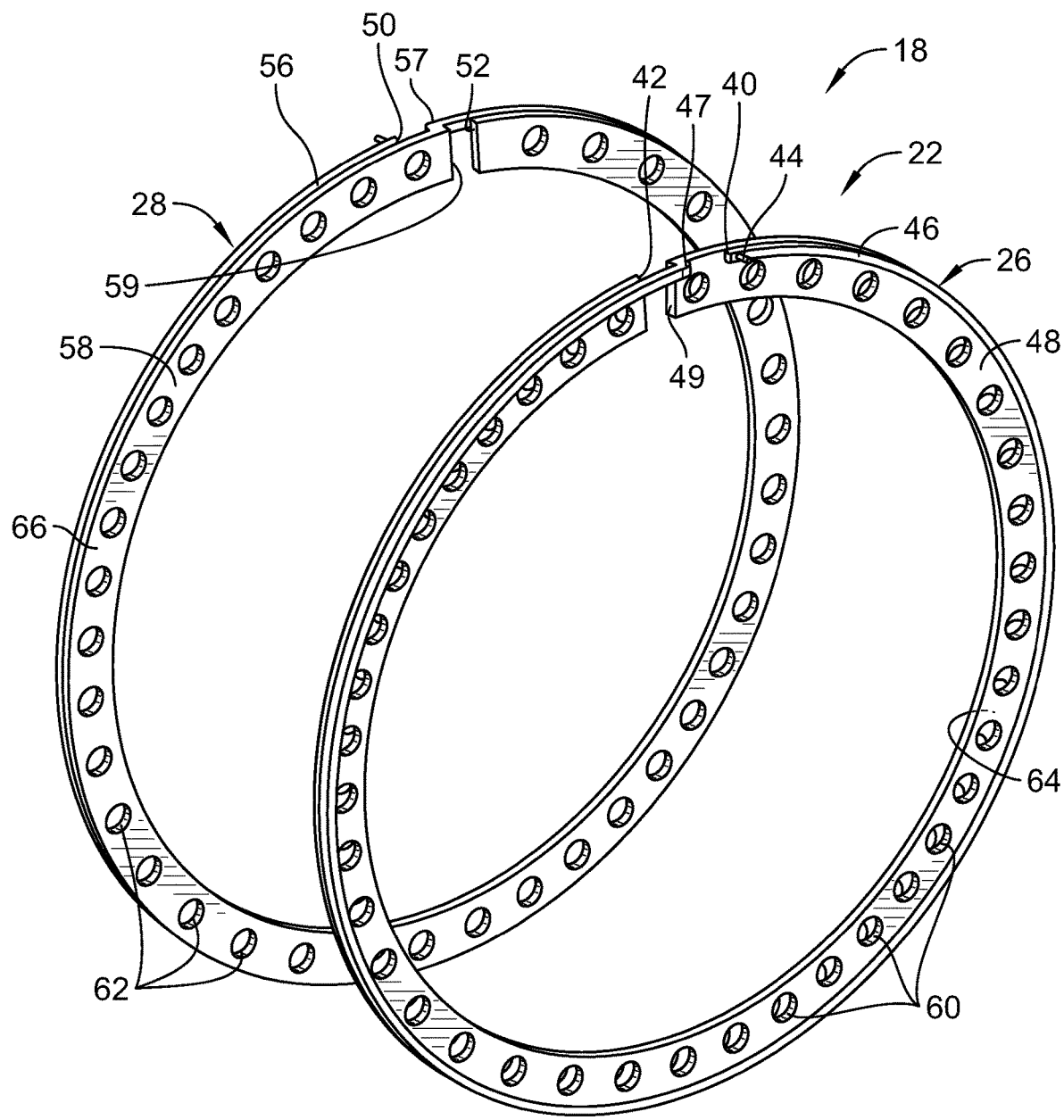
FIG. 3 is an exploded perspective assembly view of the variable cooling meter assembly of FIG. 2 showing the variable cooling meter assembly includes a first metering band axially forward of a second metering band, each of the bands includes an extension ring that extends circumferentially around the axis and couples to an aperture panel, and each of the aperture panels includes a plurality of cooling holes that extend through the bands and form a portion of the cooling passageway.
Figure 4:
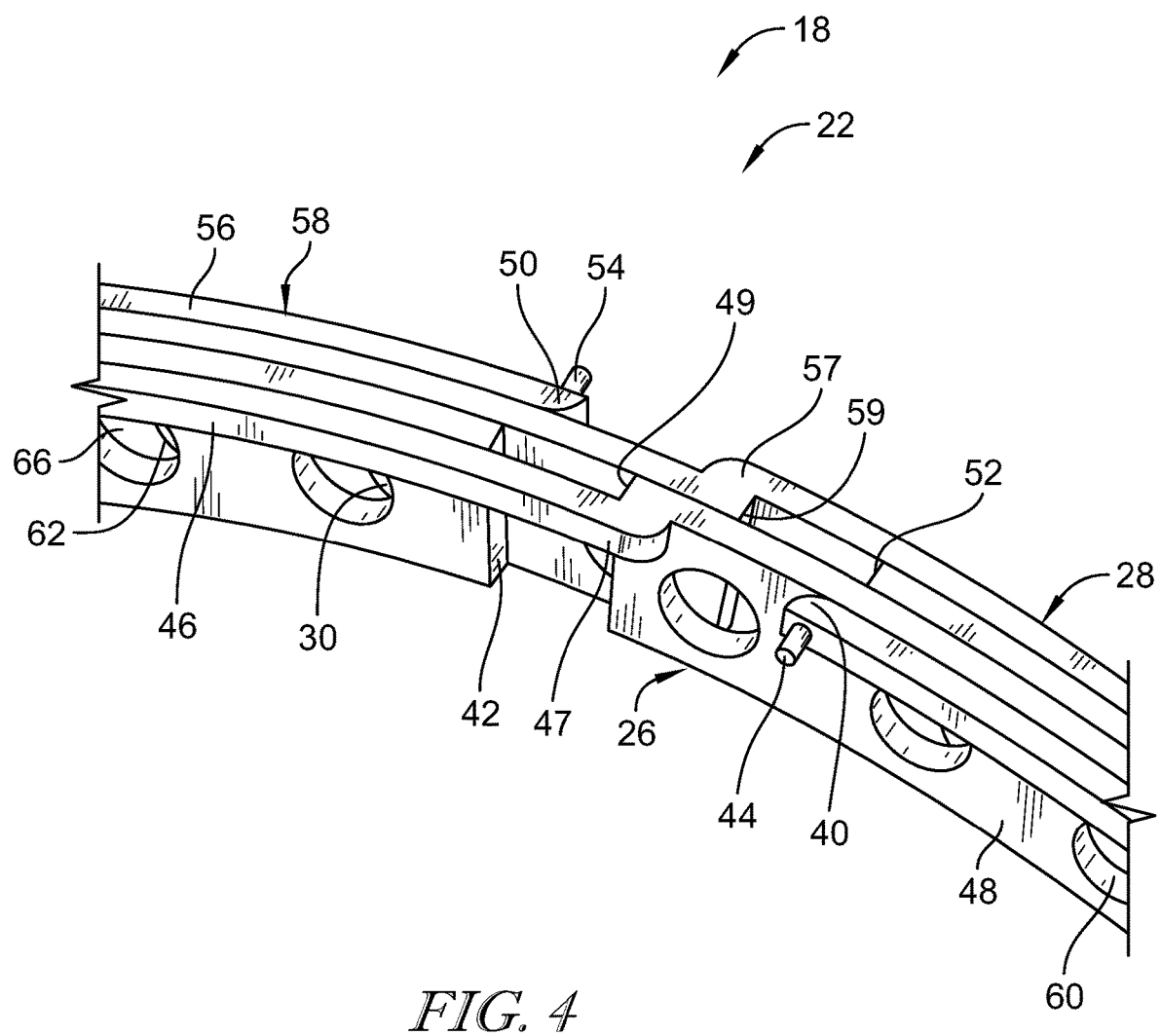
FIG. 4 is a detailed perspective view of the variable cooling meter assembly of FIG. 2 showing the extension ring of the first metering band includes a first pin that couples to a forward static component allowing the first metering band to expand circumferentially in a clockwise direction relative to the first pin, the extension ring of the second metering band includes a second pin coupled to an aft static component allowing the second metering band to expand circumferentially in a counter-clockwise direction relative to the second pin, and the plurality of cooling holes in the first and second metering bands overlap and vary the area of the cooling passage as the metering bands expand in opposite directions.

The variable cooling meter assembly 22 includes a forward metering band 26 and an aft metering band 28 located adjacent and aft of the forward metering band 26 as shown in FIGS. 2-4. The forward metering band 26 includes a first aperture panel 48 and a plurality of cooling holes 60 that extends through the first aperture panel 48. The aft metering band 28 includes a second aperture panel 58 and a plurality of cooling holes 62 that extends through the second aperture panel. The first aperture panel 48 is adjacent to the second aperture panel 58 so that the plurality of cooling holes 60 of the first aperture panel 48 overlap with the plurality of cooling holes 62 of the second aperture panel 58. In other embodiments, the variable cooling meter assembly 22 may be used to regulate cooling of other components in the combustor, an afterburner, or any other hot sections of the engine.

A portion 30 of the cooling passageway 24 is formed by the gap created between the overlapping plurality of cooling holes 60, 62 as shown in FIG. 4. When the gas turbine engine 10 is at idle operating condition, the forward and aft metering bands 26, 28 are in a cold state and the plurality of cooling holes 60, 62 are at least partially misaligned so that the portion 30 of the cooling passageway 24 has a smallest area. As the gas turbine engine 10 heats up, the forward and aft metering bands 26, 28 circumferentially expand in opposite directions causing the plurality of cooling holes 60, 62 to move into greater alignment with each other, increasing the area of the portion 30 of the cooling passageway 24. When the gas turbine engine 10 reaches a maximum operating temperature, the forward and aft metering bands 26, 28 are configured to be aligned at a maximum extent and provide maximum area of the portion 30 of the cooling passageway 24, therefore providing maximum cooling flow to components in the turbine 18.

In some embodiments, the portion 30 of the cooling passageway 24 has a minimum area while still being sized to allow some airflow through at cold build or engine off. In some embodiments, the portion 30 of the cooling passageway 24 at maximum operating temperatures has a maximum area relative to a range of achievable areas for a given geometry and temperature envelope, but the holes 60, 62 remain at least partially misaligned at maximum area. In some embodiments, the portion 30 of the cooling passageway 24 at maximum operating temperatures has a maximum area relative to a range of achievable areas and the holes 60, 62 are fully aligned with each other at maximum area.

The fan 12 is driven by the turbine 18 and provides thrust for propelling an air vehicle as shown in FIG. 1. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. Air in the compressor 14 is colder than the hot, high-pressure products in the turbine 18, and compressor air can be redirected to be used for cooling purposes of turbine 18 components. In some embodiments, the fan 12 may be replaced with a propeller, drive shaft, or other suitable configuration.

The turbine 18 includes at least one turbine rotor 19, the static component 20, and the variable cooling meter assembly 22 as shown in FIG. 2. In the illustrative embodiment, the static component 20 and the variable cooling meter assembly 22 are located radially inward of the gas path 15 and axially forward of the turbine rotor 19. In some embodiments, the static component 20 and the variable cooling meter assembly 22 may be positioned where the cooling air exits the compressor 14. In other embodiments, the static component 20 and the variable cooling meter assembly 22 may be positioned radially outward of the flow path 15.

The static component 20 extends circumferentially around the central axis 11 and includes a forward fixing location 32, an aft fixing location 34, and a channel 36 as shown in FIG. 2. The forward fixing location 32 provides a point of attachment for the forward metering band 26 and is located forward of aft fixing location 34 and the forward metering band 26. The aft fixing location 34 provides a point of attachment for the aft metering band 28 and is located aft of the forward fixing location 32 and the forward metering band 26. The channel 36 extends into the static component 20 from a forward end and provides a full-annular slot for the variable cooling meter assembly 22 to be assembled into.

The channel 36 includes an aft support wall to prevent the variable cooling meter assembly 22 from axially rearward movement as shown in FIG. 2. When the variable cooling meter assembly 22 is assembled into the channel 36, a forward retaining plate or similar retaining feature can be assembled to the forward end of the static component 20 to prevent axially forward movement of the variable cooling meter assembly 22. In the illustrative embodiment of FIG. 2, the static component 20 further includes assembly springs to bias the variable cooling meter assembly 22 towards the aft retaining features of the channel 36. In some embodiment, w-seals may be used to bias the variable cooling meter assembly 22 towards the aft retaining features of the channel 36 and provide a seal to minimize air leakage around the variable cooling meter assembly 22. In some embodiments the channel 36 may be a radially extending groove in the static component 20 and the variable cooling meter assembly 22 may be radially compressed in the assembly and then expanded into the groove so that the groove retains the variable cooling meter assembly 22 axially.

The static component 20 forms a cooling passageway 24 that extends through the static component 20 to direct cooling air rearward through the engine. In the illustrative embodiment, the cooling passageway 24 extends rearward through the channel 36 of the static component 20 and then radially inward towards apertures in the static component 20 and the shaft of the turbine rotor 19. Cooling air may then pass between the shafts and into the cavity aft of the turbine rotor 19.

The variable cooling meter assembly 22 varies the amount of cooling air that may pass through the cooling passageway 24 and includes a forward metering band 26 and an aft metering band 28 as shown in FIGS. 2-4. The variable cooling meter assembly 22 is located in a channel 36 of the static component 20 so that the variable cooling meter assembly 22 forms a portion 30 of the cooling passageway 24. As the forward metering band 26 and the aft metering band 28 expand and contract circumferentially, the area of the portion 30 of the cooling passageway 24 may vary to adjust the amount of cooling air that may flow into the turbine.

The forward metering band 26 includes a first terminal end 40, a second terminal end 42, a pin 44, an expansion ring 46, and a first aperture panel 48 as shown in FIGS. 3 and 4. The pin 44 is extends axially forward from the expansion ring 46 at the first terminal end 40. The pin 44 is attached to the forward fixing location 32 of the static component 20 so that the pin 44 and the first terminal end 40 of the forward metering band 26 are fixed relative to the axis 11. The second terminal end 42 of the forward metering band 26 is free to move relative the first terminal end 40. The expansion ring 46 has a first radial thickness and extends from the first terminal end 40 circumferentially around the axis 11 to a distal end 47 of the expansion ring 46. The expansion ring 46 extends less than 360 degrees around the axis 11 so that there is a circumferential gap between the distal end 47 and the first terminal end 40. The distal end 47 of the expansion ring 46 is coupled to a first end 49 of the first aperture panel 48.

The first aperture panel 48 has a second radial thickness greater than the first radial thickness of the expansion ring 46 and extends circumferentially around the axis 11 in the same direction as the expansion ring 46 as shown in FIGS. 3 and 4. The first aperture panel 48 overlaps with the expansion ring 46 on an aft side of the expansion ring 46 as shown in FIGS. 3 and 4. The first aperture panel 48 extends circumferentially around the axis 11 less than 360 degrees to the second terminal end 42 of the forward metering band 26 so that there is a circumferential gap between the second terminal end 42 and the first end 49 of the first aperture panel 48. The first aperture panel 48 includes a plurality of cooling holes 60 and an aft panel surface 64. The plurality of cooling holes 60 extends axially through the first aperture panel 48 and are equally spaced circumferentially around the axis 11. The aft panel surface 64 is adjacent to the aft metering band 28 and engages a forward panel surface 66 of the aft metering band 28.

In some embodiments, the plurality of cooling holes 60 may have varying circumferential spacing between the first end 49 and the second terminal end 42 of the first aperture panel 48. The circumferential distance between the plurality of cooling holes 60 may increase the further away the holes are from the first end 49 to accommodate greater thermal growth further from the fixed first terminal end 40 of the forward metering band 26. As such, the circumferential distance between the plurality of cooling holes 60 near the first end 49 of the first aperture panel 48 may be less than the circumferential distance between the plurality of cooling holes 60 near the second terminal end 42. In other embodiments, the size and shape of the plurality of cooling holes 60 may vary around the circumferential length of the first aperture panel 48.

The aft metering band 28 includes a first terminal end 50, a second terminal end 52, a pin 54, an expansion ring 56, and a second aperture panel 58 as shown in FIGS. 3 and 4. The pin 54 is extends axially aft from the expansion ring 56 at the first terminal end 50. The pin 54 is attached to the aft fixing location 34 of the static component 20 so that the pin 54 and the first terminal end 50 of the aft metering band 28 are fixed relative to the axis 11. The second terminal end 52 of the aft metering band 28 is free to move relative the first terminal end 50. The expansion ring 56 has a first radial thickness and extends from the first terminal end 50 circumferentially around the axis 11 to a distal end 57 of the expansion ring 56. In the illustrative embodiment, the expansion ring 56 extends circumferentially in the opposite direction than the expansion ring 46 of the forward metering band 26. The expansion ring 56 extends less than 360 degrees around the axis 11 so that there is a circumferential gap between the distal end 57 and the first terminal end 50. The distal end 57 of the expansion ring 56 is coupled to a first end 59 of the second aperture panel 58.

The second aperture panel 58 has a second radial thickness greater than the first radial thickness of the expansion ring 56 and extends circumferentially around the axis 11 in the same direction as the expansion ring 56 as shown in FIGS. 3 and 4. The second aperture panel 58 overlaps with the expansion ring 56 on a forward side of the expansion ring 56 as shown in FIGS. 3 and 4. The second aperture panel 58 extends circumferentially around the axis 11 less than 360 degrees to the second terminal end 52 of the aft metering band 28 so that there is a circumferential gap between the second terminal end 52 and the first end 59 of the second aperture panel 58. The second aperture panel 58 includes a plurality of cooling holes 62 and a forward panel surface 66. The plurality of cooling holes 62 extend axially through the second aperture panel 58 and are equally spaced circumferentially around the axis 11. The forward panel surface 66 is adjacent to the forward metering band 26 and engages the aft panel surface 64 of the forward metering band 26.

In some embodiments, the plurality of cooling holes 62 may have varying circumferential spacing between the first end 59 and the second terminal end 52 of the second aperture panel 58. The circumferential distance between the plurality of cooling holes 62 may increase the further away the holes are from the first end 59 to accommodate greater thermal growth further from the fixed first terminal end 50 of the aft metering band 28. As such, the circumferential distance between the plurality of cooling holes 62 near the first end 59 of the second aperture panel 58 may be less than the circumferential distance between the plurality of cooling holes 62 near the second terminal end 52. In other embodiments, the size and shape of the plurality of cooling holes 62 may vary around the circumferential length of the second aperture panel 58.

The plurality of cooling holes 60 of the forward metering band 26 and the plurality of cooling holes 62 of the aft metering band 28 circumferentially overlap and form a gap therebetween that forms a portion 30 of the cooling passageway 24 as shown in FIG. 4. When the engine 10 is in a cold assembly state or low power condition such as idle, the plurality of cooling holes 60, 62 overlap a small amount such that the area of the portion 30 is less than either the area of the plurality of cooling holes 60 or the plurality of cooling holes 62.

As the engine 10 generates heat, the temperature of the forward metering band 26 increases so that the expansion ring 46 and the first aperture panel 48 expand circumferentially and the second terminal end 42 extends away from the fixed pin 44 at the first terminal end 40. The circumferential expansion causes the plurality of cooling holes 60 to move circumferentially relative to the fixed pin 44. At the same time, the temperature of the aft metering band 28 increases so that the expansion ring 56 and the second aperture panel 58 expand circumferentially and the second terminal end 52 extends away from the fixed pin 54 at the first terminal end 50 in the opposite direction to the forward metering band 26. The circumferential expansion causes the plurality of cooling holes 62 to move circumferentially relative to the fixed pin 54.

The plurality of cooling holes 60 and the plurality of cooling holes 62 move in opposite circumferential directions increasing the overlapping portion of the plurality of cooling holes 60, 62. As the temperature increases in the engine 10, the gap formed between the plurality of cooling holes 60, 62 becomes larger resulting in the area of the portion 30 of the cooling passageway 24 increasing. This allows more cooling air to pass through the portion 30 of the cooling passageway 24 and more cooling air to be fed to the component of the turbine 18. The forward and aft metering bands 26, 28 may be configured so that at a maximum operating temperature, the plurality of cooling holes 60, 62 extend such that they are aligned to the maximum extent and the portion 30 of the cooling passageway 24 has largest area and provides maximum cooling flow to the turbine 18.

The temperature of engine components may be highest toward the end of their life after they have experienced degradation. The assembly 22 is configured so that the highest temperatures cause the most alignment of the holes 60, 62 so maximum cooling occurs at maximum temperature of the components.

The circumferential length of the expansion ring 46 of the forward metering band 26 can be sized to adjust the amount of circumferential movement of the plurality of cooling holes 60. A larger circumferential length of the expansion ring 46 will yield more circumferential expansion and allow the plurality of cooling holes 60 to extend circumferentially further. The circumferential length of the expansion ring 56 of the aft metering band 28 can be sized to adjust the amount of circumferential movement of the plurality of cooling holes 62. The material of the metering bands 26, 28 may also be selected for a particular coefficient of thermal expansion to further vary the circumferential movement of the plurality of cooling holes 60, 62. Different materials with different coefficients of thermal expansion may be selected so that the forward metering band 26 has a material with a first coefficient of thermal expansion, and the aft metering band 28 has a material with a second coefficient of thermal expansion. The circumferential length of the expansion rings 46, 56 and the materials of the metering bands may be selected for optimum control of the area of the portion 30 of the cooling passageway 24.

In some embodiments, the forward metering band 26 and the aft metering band 28 may extend circumferentially around the axis 11 in the same direction. Differences in the circumferential lengths of the expansion rings 46, 56, and different coefficient of thermal expansions of the materials used for each of the metering bands allow the metering bands 26, 28 to extend different amounts for the same change in temperature of the engine 10. For example, the expansion ring 46 of the forward metering band 26 may be longer than the expansion ring 56 of the aft metering band 28 so that for the same change in temperature, the expansion ring 46 will extend further than the expansion ring 56. In addition, the forward metering band 26 may have material with greater coefficient of thermal expansion than the material of the after metering band 28 so that the forward metering band 26 extends further than the aft metering band for the same temperature increase.

In another embodiment, the plurality of cooling holes 60, 62 may be aligned in a cold state so that the portion 30 of the cooling passageway 24 has maximum area. The area of the portion 30 may reduce as the metering bands expand and the plurality of cooling holes move out of alignment with each other. This may be useful to redirect cooling air from one component to another component as the engine 10 approaches maximum operating condition.

Figure 5:
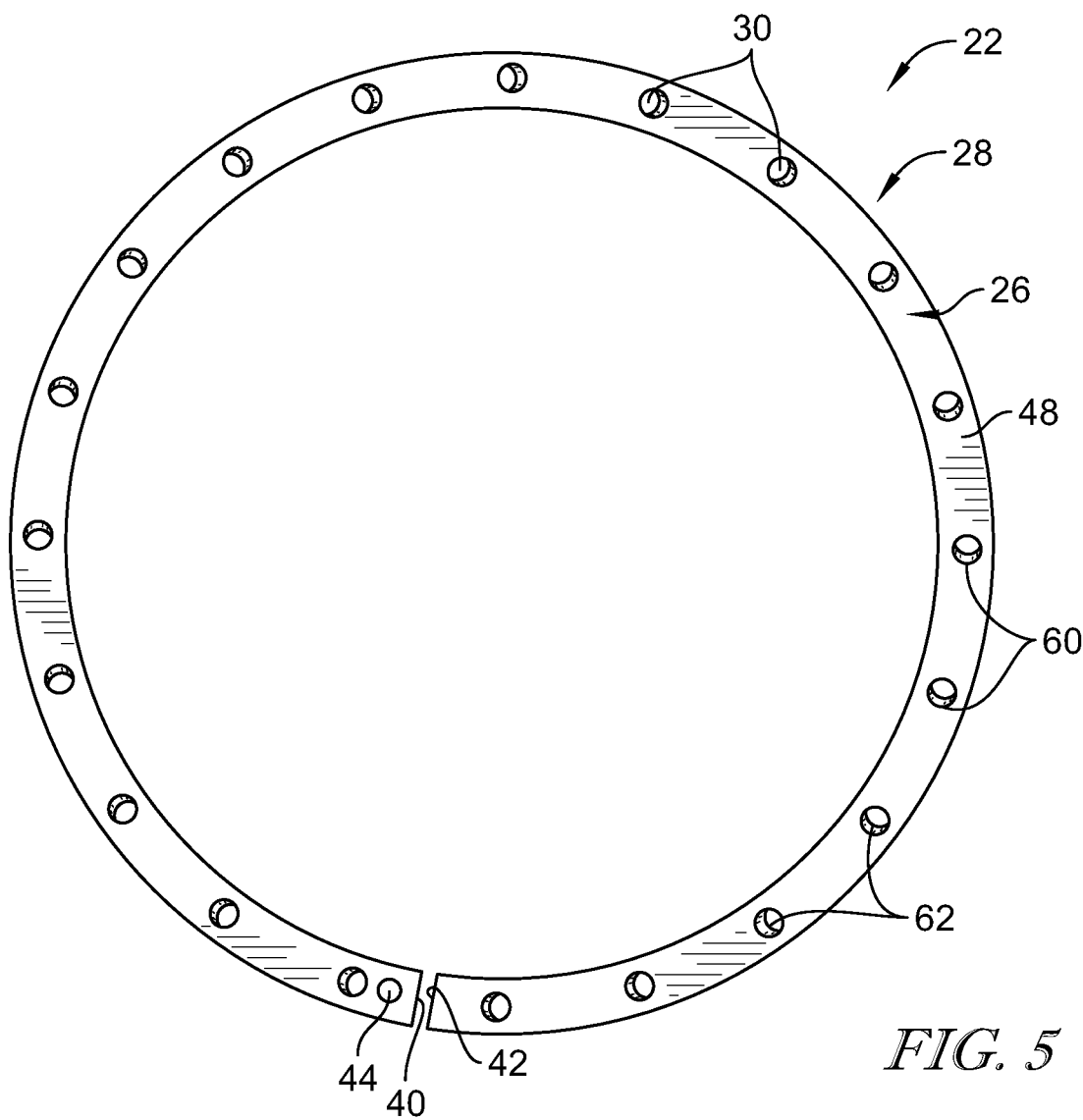
FIG. 5 is a forward elevation view of another embodiment of the variable cooling meter assembly of FIG. 2 showing the first and second metering bands do not include an expansion ring and the aperture panels include pins that may couple to forward and aft static components, and the overlapping plurality of cooling holes in the illustrative view show a cooling area that is partially restricted from a maximum possible cooling area.
Figure 6:
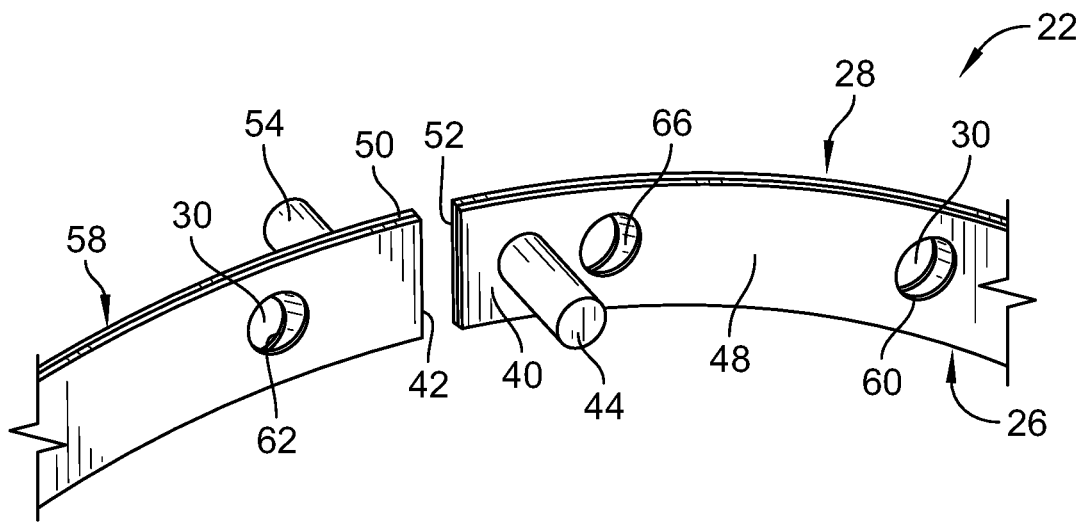
FIG. 6 is a detailed perspective view of the variable cooling meter assembly of FIG. 5 showing the first metering band includes a pin that extends axially forward, and the second metering band includes a pin that extends axially aft so that the first metering band may extend circumferentially in a clockwise direction and the second metering band may extend circumferentially in a counter-clockwise direction.

In a further embodiment, the forward metering band 26 may not include the expansion ring 46, and the aft metering band 28 may not include the expansion ring 56 as shown in FIGS. 5 and 6. The pin 44 may extend axially forward from the first aperture panel 48 at the first terminal end 40. The first aperture panel 48 may extend circumferentially away from the first terminal end 40 around the axis 11. The pin 54 may extend axially aft from the second aperture panel 58 at the first terminal end 50. The second aperture panel 58 may extend circumferentially away from the first terminal end 50 around the axis 11. The plurality of cooling holes 60, 62 may overlap and form a portion 30 of the cooling passageway 24. This embodiment may offer less circumferential relative movement between the forward metering band 26 and the aft metering band 28.

In some embodiments, the aft metering band 28 may be completely fixed to the static component 20 so that only the forward metering band 26 may extend circumferentially with changes in temperature of the engine 10. The plurality of cooling holes 62 of the aft metering band 28 may be fixed relative to the axis 11 and the plurality of cooling holes 60 of the forward metering band 26 may move circumferentially relative to the axis 11 to adjust the area of the gap formed between the plurality of cooling holes 60, 62. In other embodiments, the forward metering band 26 may be fixed relative to the axis 11 and the aft metering band 28 may extend relative to the axis 11 to adjust the area of the portion 30 of the cooling passageway 24.

Another embodiment of gas turbine engine 210 in accordance with the present disclosure is shown in FIGS. 5 and 6. The gas turbine engine 210 is substantially similar to the gas turbine engine 10 shown in FIGS. 1-4 and described herein. Accordingly, similar reference numbers in the 200 series indicate features that are common between the gas turbine engine 210 and the gas turbine engine 10. The description of the gas turbine engine 10 is incorporated by reference to apply to the gas turbine engine 210, except in instances when it conflicts with the specific description and the drawings of the gas turbine engine 210.

Figure 7:
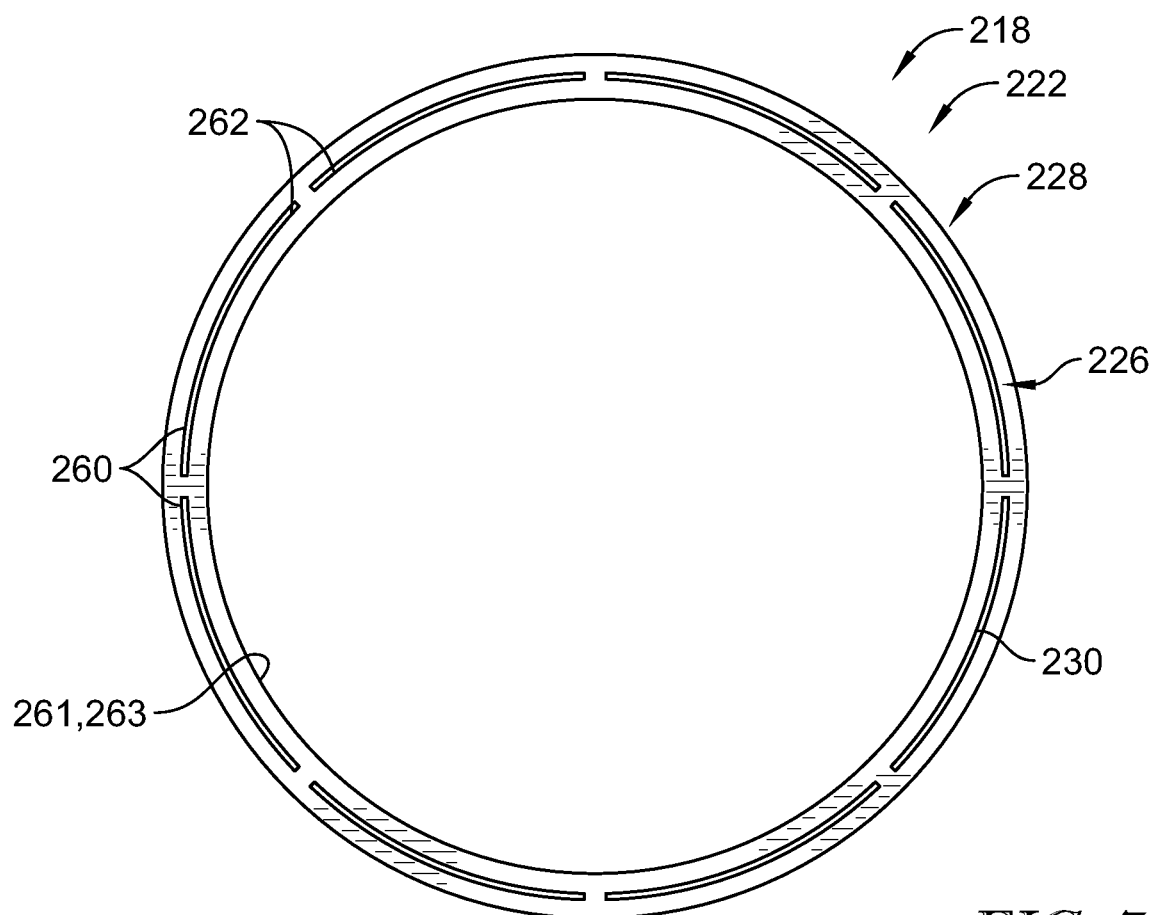
FIG. 7 is a forward elevation view of another embodiment of the variable cooling meter assembly of FIG. 2 showing the first and second metering bands are full-hoop rings that extend around the axis and each band includes a plurality of annular circumferentially extending slots that extend through the metering band.
Figure 8:
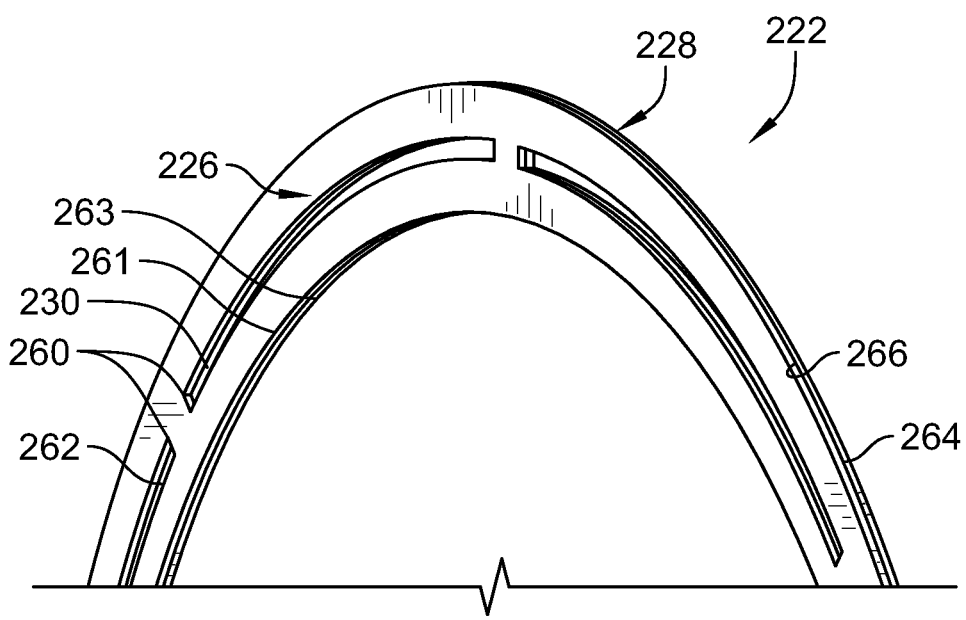
FIG. 8 is a detailed perspective view of the variable cooling meter assembly of FIG. 7 showing plurality of annular slot of the first and second metering bands overlap and vary the size of the cooling passage as the first and second metering bands extend radially outward and inward by different distances dependent on the thermal expansion coefficient of the materials of the first and second metering bands.

The gas turbine engine 210 includes a static component 220, a variable cooling meter assembly 222, and a cooling passageway 224 as shown in FIGS. 7 and 8. The static component 220 includes a channel 236 that locates the variable cooling meter assembly 222 axially but allows for radial outward growth of the variable cooling meter assembly 222. The variable cooling meter assembly 222 varies the amount of cooling air that may pass through the cooling passageway 224 and includes a forward metering band 226 and an aft metering band 228. The variable cooling meter assembly 222 forms a portion 230 of the cooling passageway 224. As the forward metering band 226 and the aft metering band 228 expand and contract radially, the area of the portion 230 of the cooling passageway 224 may vary to adjust the amount of cooling air that may flow therethrough.

The forward metering band 226 extends around the axis 11 to form a full annular hoop and includes a plurality of circumferential slots 260, an inner support surface 261, and an aft band surface 264 as shown in FIGS. 7 and 8. The inner support surface 261 rests on an inner surface of the channel 236 and prevents the forward metering band 226 from expanding radially inward when the temperature increases in the engine 210. The plurality of circumferential slots 260 extend axially through the forward metering band 226 and circumferentially extend a portion around the axis 11. The aft band surface 264 is adjacent to the aft metering band 228 and engages a forward band surface 266 of the aft metering band 228.

The aft metering band 228 extends around the axis 11 to form a full annular hoop and includes a plurality of circumferential slots 262, an inner support surface 263, and a forward band surface 266 as shown in FIGS. 7 and 8. The inner support surface 263 rests on an inner surface of the channel 236 and prevents the aft metering band 228 from expanding radially inward when the temperature increases in the engine 210. The plurality of circumferential slots 262 extend axially through the aft metering band 228 and circumferentially extend a portion around the axis 11. The aft band surface 264 is adjacent to the forward metering band 226 and engages an aft band surface 264 of the forward metering band 226.

The plurality of circumferential slots 260 of the forward metering band 226 and the plurality of circumferential slots 262 of the aft metering band 228 overlap and form a circumferentially extending gap therebetween that forms a portion 230 of the cooling passageway 224 as shown in FIGS. 7 and 8. When the engine 210 is in a cold assembly state or low power condition such as idle, the plurality of circumferential slots 260, 262 overlap a small amount such that the area of the portion 30 is less than either the area of the plurality of circumferential slots 260 or the plurality of circumferential slots 262.

As the engine 210 generates heat, the temperature of the forward metering band 226 increases so that the forward metering band 226 extends radially outward relative to the inner support surface 261. The radial expansion causes the plurality of circumferential slots 260 to move radially outward. At the same time, the temperature of the aft metering band 228 increases so that the aft metering band 228 extends radially outward relative to the inner support surface 263. The radial expansion causes the plurality of circumferential slots 262 to move radially outward.

The forward metering band 226 and the aft metering band 228 may be made from different materials so that the forward metering band 226 has a first coefficient of thermal expansion and the aft metering band 228 has a second coefficient of thermal expansion. For a given temperature, the forward metering band 226 will expand radially outward a different distance to the aft metering band 228. The varying radial expansion of the forward and aft metering bands 226, 228, allows the overlapping portion of the circumferential slots 260, 262 to change with temperature and thus changing the area of the portion 230 of the cooling passageway 224.

In some embodiments, the plurality of circumferential slots 260 may be radially inward of the plurality of circumferential slots 262 when the engine 210 is cold to for a gap between an upper portion of the plurality of circumferential slots 260 and a lower portion of the plurality of circumferential slots 262. As the temperature of the engine 210 increases, the forward metering band 226 may have material selected with a greater coefficient of thermal expansion than the aft metering band 228 such that the plurality of circumferential slots 260 moves radially outward a greater distance than the plurality of circumferential slots 262 so that the plurality of circumferential slots 260, 262 become radially aligned to a maximum extent. When the plurality of circumferential slots 260, 262 are radially aligned to the maximum extent, the area of the portion 230 is at its largest and provides maximum cooling flow to the components in the turbine 218.

Figure 9:
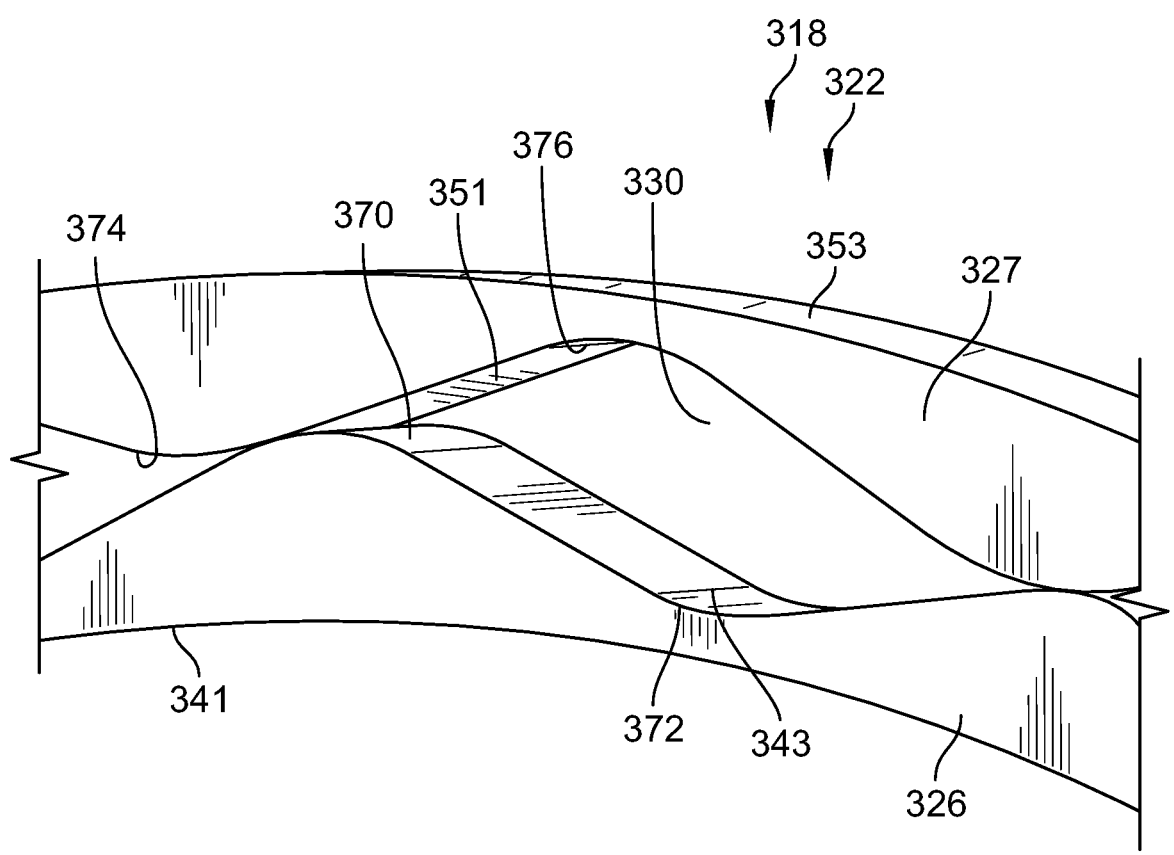
FIG. 9 is a detailed perspective view of another embodiment of the variable cooling meter assembly of FIG. 2 showing a thermal expansion ring that has an undulating radially outward surface and an aperture ring that has an undulating radially inward surface that engages the undulating surface of the thermal expansion ring, and the thermal expansion ring expands and extends circumferentially relative to the aperture ring so that the undulating surfaces push the rings apart and increase the cooling passage between the two rings.

Another embodiment of a gas turbine engine 310 in accordance with the present disclosure is shown in FIG. 9. The gas turbine engine 310 is substantially similar to the gas turbine engine 10 shown in FIGS. 1-4 and described herein. Accordingly, similar reference numbers in the 300 series indicate features that are common between the gas turbine engine 310 and the gas turbine engine 10. The description of the gas turbine engine 10 is incorporated by reference to apply to the gas turbine engine 310, except in instances when it conflicts with the specific description and the drawings of the gas turbine engine 310.

The gas turbine engine 310 includes a static component 320, a variable cooling meter assembly 322, and a cooling passageway 324 as shown in FIG. 9. The variable cooling meter assembly 322 varies the amount of cooling air that may pass through the cooling passageway 324 and is located in the static component 320. The variable cooling meter assembly 322 includes a thermal expansion ring 326 and an aperture ring 327 located radially outward of the thermal expansion ring 326. The thermal expansion ring 326 expands circumferentially relative to the aperture ring 327 to vary the area of a portion 330 of the cooling passageway 324.

The thermal expansion ring 326 is fixed at a first terminal end 340 relative to the static component 320 and includes a radially inner surface 341 and an undulating outer surface 343 as shown in FIG. 9. The radially inner surface 341 engages the channel 336 of the static component 320 and prevents radially inward movement of the thermal expansion ring 326. The undulating outer surface 343 includes a first portion 370 and a second portion 372 radially inward of the first portion 370. The first portion 370 and second portion 372 are smoothly integrated so that the undulating outer surface 343 forms a sinusoidal curve around the circumference when viewed from the front. In some embodiments, the undulating outer surface 343 may have a sinusoidal curve with increasing wavelength as the thermal expansion ring 326 extends circumferentially away from the first terminal end 340 to accommodate greater thermal growth further from the fixed first terminal end 340. The thermal expansion ring 326 is coupled to the static component 320 at a first terminal end 340 so that a second terminal end 342 of the thermal expansion ring is free to circumferentially extend away from the first terminal end 340.

The aperture ring 327 is fixed at a first terminal end 350 relative to the static component 320 and includes an undulating inner surface 351 and a radially outer surface 353 as shown in FIG. 9. The undulating inner surface 351 includes a first portion 374 and a second portion 376 radially outward of the first portion 374. The first portion 374 and second portion 376 are smoothly integrated so that the undulating inner surface 351 forms a sinusoidal curve around the circumference when viewed from the front. In some embodiments, the undulating inner surface 351 may have a sinusoidal curve with increasing wavelength as the aperture ring 327 extends circumferentially away from the first terminal end 350 to accommodate greater thermal growth further from the fixed first terminal end 350. The aperture ring 327 is coupled to the static component 320 at a first terminal end 350 so that a second terminal end 352 of the aperture ring 327 is free to circumferentially extend away from the first terminal end 350.

The undulating outer surface 343 of the thermal expansion ring 326 and the undulating inner surface 351 of the aperture ring 327 engage with each other and form a portion 330 of the cooling passageway 324 therebetween as shown in FIG. 9. When the engine 310 is in a cold assembly state or low power condition such as idle, the first portion 370 of the undulating outer surface 343 of the thermal expansion ring 326 at least partially aligns circumferentially with the second portion 376 of the undulating inner surface 351 of the aperture ring 327. The second portion 372 of the undulating outer surface 343 of the thermal expansion ring 326 also partially aligns circumferentially with the first portion 374 of the undulating inner surface 351 of the aperture ring 327. In this configuration, the area of the portion 330 between the thermal expansion ring 326 and the aperture ring 327 is smallest.

As the engine 310 generates heat, the temperature of the thermal expansion ring 326 increases so that the second terminal end 342 extends away from the first terminal end 340. The circumferential expansion causes the undulating outer surface 343 of the thermal expansion ring 326 to bias the undulating inner surface 351 of the aperture ring 327 radially outward. The first portion 370 of the undulating outer surface 343 circumferentially moves from the engaging the second portion 376 of the undulating inner surface 351 to engaging the first portion 374 of the undulating inner surface 351. This forms a larger gap between the undulating outer surface 343 of the thermal expansion ring 326 and the undulating inner surface 351 of the aperture ring 327 so that the area of the portion 330 of the cooling passageway 324 increases.

In some embodiments, the aperture ring 327 is fixed relative to the static component. In other embodiments, the aperture ring 327 circumferentially extends in the opposite direction to the thermal expansion ring 326 so that larger relative movement between the thermal expansion ring 326 and the aperture ring 327 is possible. In further embodiments, the aperture ring 327 expands in the same direction as the thermal expansion ring 326.

The cooling flows in a gas turbine engine 10 may be configured based on the maximum temperatures the components are expected to experience, which generally occur when the engine is fully deteriorated and is running at a maximum operating condition. In conventional engines, the percentage of engine flow used for cooling may be fixed for the life of the component and may not be adjusted to compensate for deteriorating performance and increasing temperatures. As a result, the supplied cooling flow may not be optimized in relation to the deterioration of the engine which may result in reduced efficiency and increased fuel consumption. Component cooling flows may be typically controlled by metering features of fixed size that are not adjustable during engine operation.

The present disclosure may improve engine efficiency and reduce fuel consumption over the life of the engine by adjusting the amount of cooling air supplied to cooled components as the engine deteriorates. This may be achieved by various means including, but not limited to: seals, annuli, passages, apertures, etc. incorporated into the air system that increase in flow area as the engine deteriorates. Features such as these may be used independently or in combination, including in combination with typical metering features of fixed size. The area of the metering features may be varied actively, such as by mechanical or electronic actuation; or passively such as by a differential in temperature or pressure, or through the wear and deterioration of a seal.

In one embodiment, illustratively shown in FIGS. 2-4, the assembly includes two rings 26, 28, each with an array of features which meter the flow of cooling air 60, 62. Circular holes 60, 62 are shown for simplicity, but the features may be of any size or shape including scallops, slots, etc. which together create apertures to meter airflow. In this example, the rings 26, 28 may be fixed to the surrounding structure 20 at opposite ends such that the rings 26, 28 move circumferentially past one another due to thermal growth during engine operation.

The initial relative circumferential position of the rings 26, 28 and the arrangement of the metering features 60, 62 can be specified such that the aperture area 30 either increases or decreases, whichever is desired, as the temperature of the rings 26, 28 increases. Additionally, the material of each ring 26, 28 and the corresponding coefficient of thermal expansion can be individually selected to achieve the desired response. Alternatively, the same rings in this example could be mechanically actuated to vary the aperture area.

Metering features may be used alone, or together with other flow metering features, either in series or parallel, to adjust the flow as the engine operates for a given mission profile or use of the engine, or as the operating temperatures change over the life of the engine.

In another embodiment, two adjacent rings 226, 228 may have similar annular slots 260, 262 to provide flow metering as shown in FIGS. 7 and 8. As in the previous embodiment, the material and coefficient of thermal expansion of the rings may be selected such that the rings 226, 228 have differing rates of thermal expansion, thus modulating the resulting annular flow area 230 as the engine operating temperature changes. Annular slots 260, 262 may be provided as one possible flow metering geometry, but other geometries may be employed to the same effect.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An assembly adapted for use with a gas turbine engine, the assembly comprising a static component fixed relative to an axis, a first metering band arranged to extend circumferentially at least partway about the axis and coupled with the static component at a discrete location, and a second metering band located adjacent the first metering band and arranged to extend circumferentially at least partway about the axis and coupled with the static component, wherein the first metering band defines at least a portion of a cooling passageway, the second metering band defines another portion of the cooling passageway, and the first metering band is configured to expand and contract relative to the static component in response to temperature changes of the assembly to change a size of the cooling passageway, wherein the first metering band extends in a first circumferential direction about the axis from a first terminal end to a second terminal end of the first metering band, the second metering band extends in a second circumferential direction, opposite the first circumferential direction, from a first terminal end to a second terminal end of the second metering band, and the first terminal end of the first metering band and the first terminal end of the second metering band are fixed to the static component.

2. The assembly of claim 1, wherein the second metering band is located axially adjacent the first metering band.

3. The assembly of claim 1, wherein the first metering band has a first coefficient of thermal expansion, the second metering band has a second coefficient of thermal expansion, and the first coefficient of thermal expansion is different from the second coefficient of thermal expansion.

4. The assembly of claim 1, wherein the first metering band is formed to define a first aperture that extends through the first metering band, the second metering band is formed to define a second aperture that extends through the second metering band, and the cooling passageway is defined by the first aperture and the second aperture.

5. The assembly of claim 4, wherein the first aperture extends axially through the first metering band and the second aperture extends axially through the second metering band.

6. The assembly of claim 1, wherein the first metering band extends circumferentially between the first terminal end and the second terminal end and the second terminal end is free to move relative to the first terminal end.

7. The assembly of claim 1, wherein the first metering band includes a first segment having a first radial thickness and a second segment having a second radial thickness greater than the first radial thickness and the second segment is formed to include a plurality of apertures that extend axially though the first metering band.

8. The assembly of claim 1, wherein the first metering band is a full annular hoop formed to include a plurality of circumferential slots that extend axially through the first metering band.

9. An assembly adapted for use with a gas turbine engine, the assembly comprising
a static component fixed in position relative to an axis, the static component formed to define a channel that extends circumferentially around the axis,
a first metering band located in the channel and arranged to extend circumferentially at least partway about the axis, and the first metering band coupled to the static component at a first discrete location for movement with the static component,
a second metering band located in the channel and arranged to extend circumferentially at least partway about the axis, the second metering band located adjacent the first metering band, and the second metering band coupled to the static component at a second discrete location for movement with the static component,
wherein the first metering band and the second metering band cooperate to define a cooling passageway and the first metering band and the second metering band are configured to expand and contract relative to the static component in response to temperature changes of the assembly to change a size of the cooling passageway,
wherein the first metering band extends in a first circumferential direction about the axis from a first terminal end to a second terminal end of the first metering band, the second metering band extends in a second circumferential direction, opposite the first circumferential direction, from a first terminal end to a second terminal end of the second metering band, and the first terminal end of the first metering band and the first terminal end of the second metering band are fixed to the static component.

10. The assembly of claim 9, wherein the first metering band is formed to include a first aperture that extends through the first metering band, the second metering band is formed to include a second aperture that extends through the second metering band, and an overlap of the first aperture and the second aperture is configured to vary in response to the temperature changes of the assembly to change the size of the cooling passageway.

11. The assembly of claim 10, wherein the first aperture extends axially through the first metering band and the second aperture extends axially through the second metering band.

12. The assembly of claim 11, wherein the first metering band extends circumferentially between the first terminal end and the second terminal end and the second terminal end is free to move relative to the first terminal end.

13. The assembly of claim 12, wherein the first metering band includes a thermal expansion ring having a first radial thickness and an aperture ring having a second radial thickness greater than the first radial thickness, and the first aperture is formed in the aperture ring.

14. The assembly of claim 13, wherein the first metering band extends circumferentially about the axis greater than 360 degrees from the first terminal end to the second terminal end.

15. The assembly of claim 9, wherein the first metering band has a first coefficient of thermal expansion, the second metering band has a second coefficient of thermal expansion, and the first coefficient of thermal expansion is different from the second coefficient of thermal expansion.

16. The assembly of claim 9, wherein the first metering band is a full annular hoop formed to include a plurality of circumferential slots that extend axially through the first metering band and the second metering band is a full annular hoop formed to include a plurality of circumferential slots that extend axially through the second metering band.

17. A method for varying cooling flow in a gas turbine engine, the method comprising the steps of:
mounting a first metering band to a static component so that a first terminal end of the first metering band is fixed at a discrete location of the static component and a second terminal end of the first metering band is free to move relative to the first terminal end, and an aperture that extends through the first metering band forms a portion of a cooling passageway,
arranging a first aperture that extends through in the first metering band to form a portion of a cooling passageway to overlap with a second aperture that extends through the static component that forms another portion of the cooling passageway to form a cooling passage area,
varying a circumferential length of the first metering band so that the second terminal end extends away from and toward the first terminal end in response to temperature changes of the gas turbine engine so that the first aperture and the second aperture move relative to each other and vary the cooling passage area, and mounting a second metering band to the static component adjacent to the first metering band so that the second metering band is fixed to the static component at a first terminal end of the second metering band and a second terminal end is free to move relative to the first terminal end, and the second metering band forms a portion of the cooling passageway, wherein the second metering band includes a third aperture arranged to overlap the first and second aperture, and the second metering band expands in response the temperature changes of the gas turbine engine and further varies the cooling passage area.

\* \* \* \* \*